UNITED STATES PATENT OFFICE.

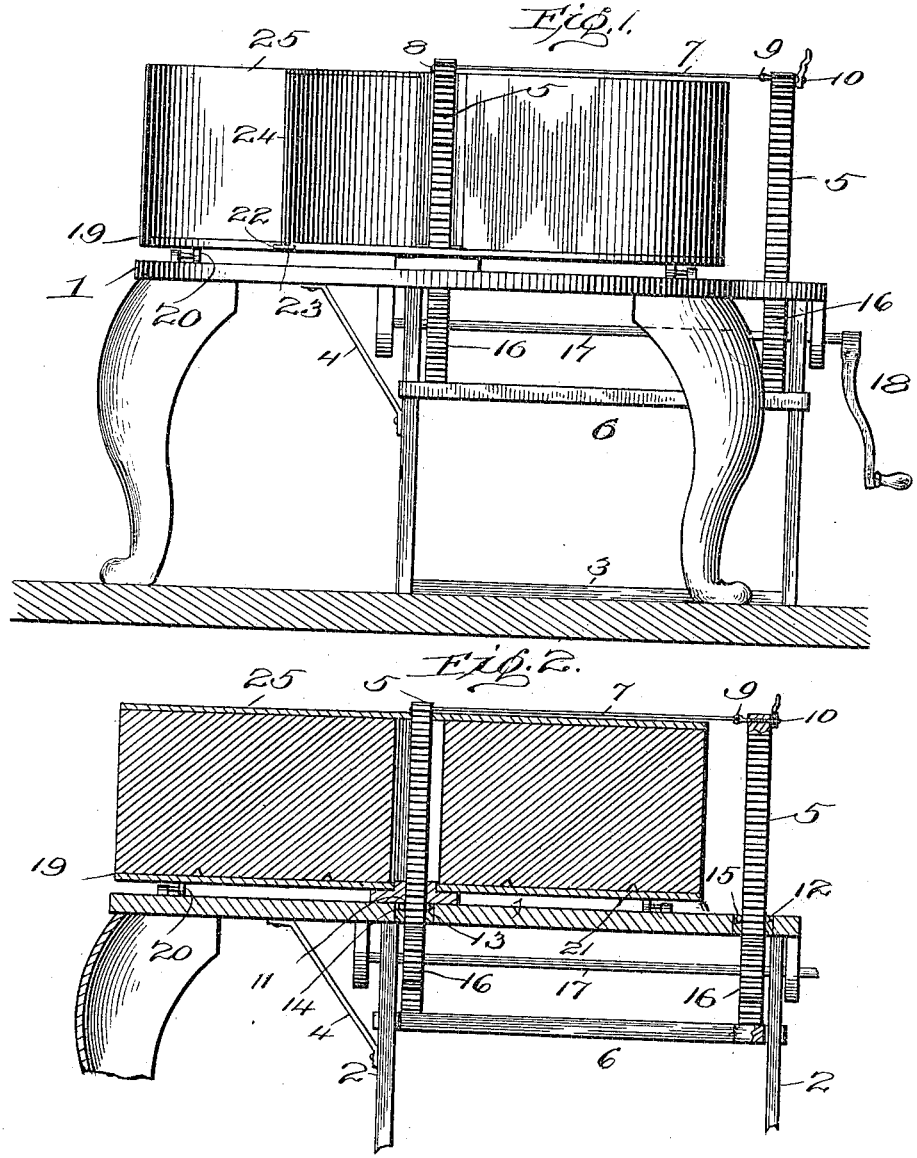

JAMES C. OWEN, OF CHICAGO, ILLINOIS.

CHEESE-CUTTER.

No. 839,632.  Specification of Letters Patent.  Patented Dec. 25, 1906.

Application filed May 19, 1905. Serial No. 261,201.

*To all whom it may concern:*

Be it known that I, JAMES C. OWEN, a citizen of the United States, residing at Chicago, in the county of Cook and State of Illinois, have invented certain new and useful Improvements in Cheese-Cutters, of which the following is a specification.

This invention relates to a machine for cutting cheese, and has for its object the production of a machine which will prevent the crumbling and consequently the waste of cheese in the cutting thereof.

Another object of this invention is to provide a revolving support for a cheese mounted upon a table and adapted to revolve under a cutter which has a vertical motion imparted thereto by a crank and gear.

A further object of this invention is to provide a cheese-cutter consisting of a frame carrying rack-bars in mesh with pinions which are driven by a hand-crank for imparting a vertical motion to the frame, the frame being mounted to travel upon guides and provided with an adjustable cutting-wire which is employed in lieu of a knife.

With these objects in view and such others as may hereinafter appear my invention consists in the particular construction of the various parts and in the novel manner of combination and arrangement of said parts, all of which will be fully described, and specifically pointed out in the appended claims.

In the drawings forming a part of this specification, Figure 1 is a view in side elevation of the complete machine. Fig. 2 is a vertical sectional view of the same.

Referring by numerals to the drawings, 1 represents a table, the top of which is circular and is supported by four short legs. Secured beneath the top of this table are perpendicular guideways 2, which are braced apart by a horizontal bar 3 and securely braced to the table by a brace 4. Mounted on the guideways and adapted to travel thereupon are corresponding racks 5, secured together at the bottom by a bar 6 and connected at the top by a fine wire 7, one end of which is detachable, as shown at 8, the other end being provided with a loop 9, which is detachably connected to a tension-screw 10, mounted in the top of one of the racks. These racks are adapted to slide up and down through apertures 11 and 12 in the top of the table. The central aperture 11 is provided with a flanged sleeve 13, having upon its interior a roller-bearing 14, which engages one of the racks, and the aperture 12 is provided with a roller-bearing 15, which engages the other rack. These racks are given a vertical motion by means of pinions 16, which are in mesh therewith and are mounted upon a shaft 17, journaled in bearings supported beneath the table, the shaft being driven by a hand-crank 18, which may be turned in either direction so as to force the rack up or down, as may be desired.

Mounted upon the flange of the sleeve 13 is a revolving circular support 19, the outer edge of which rests upon roller-bearings 20, secured upon the top of the table. This circular support is provided with a series of teeth 21, adapted to bite into the cheese, and thereby prevent it from slipping, and is further provided with a T-shaped slot 22, extending from the edge of the support to its center, which slot is adapted to receive the flange 23 upon the edge of the slide 24, which is adapted to cover one of the cut surfaces of the cheese after the first cut has been removed, also to form a support for the cheese in making the last few cuts. Placed upon the top of the cheese is a removable cover 25, which is made in two semicircular parts hinged together or disconnected, as may be desired.

Mode of operation: Assuming that an aperture has been bored through the center of a cheese, the cutting-wire is detached and the cheese placed upon the revolving support, as shown in Fig. 2. The aperture through the center permits the rack to project up above the top of the cheese. The cutting-wire is then replaced, and by turning the crank-handle the wire is drawn down through the cheese. By reversing the motion of the crank-handle the wire is raised up and is ready for the next cut. After one slice or a portion of the cheese has been cut and removed the slide is inserted, which, as before stated, covers one of the cut surfaces of the cheese and acts as a support in making the last few cuts.

Having thus described the various features of my invention, what I claim as new, and desire to secure by Letters Patent, is—

1. In a cheese-cutter, a table, a revolving support mounted on roller-bearings upon said table, guideways secured beneath the table, racks mounted to travel upon said guideways, apertures in the top of the table through which said racks move, pinions meshing with said racks, means for driving said pinions, a cutting-wire carried by said racks, a detachable slide mounted upon said revolving support, and a removable top plate, substantially as specified.

2. In a cheese-cutter, a table, a revolving support mounted on roller-bearings upon said table, the said support having a series of teeth and a slot for the reception of a slide, vertical guideways secured beneath the table, racks mounted to travel upon said guideways, a shaft having pinions thereupon in engagement with the racks, a handle for rotating the shaft, apertures in the table and revolving support through which the racks move, a detachable and adjustable cutting-wire connecting the upper ends of the racks, means for regulating the tension of the cutting-wire, and a detachable top plate, substantially as specified.

JAMES C. OWEN.

Witnesses:
CHARLES KING,
T. J. RUSSELL.